US009015687B2

United States Patent
George et al.

(10) Patent No.: US 9,015,687 B2
(45) Date of Patent: Apr. 21, 2015

(54) REGISTER LIVENESS ANALYSIS FOR SIMD ARCHITECTURES

(75) Inventors: Biju George, San Jose, CA (US); Guei-Yuan Lueh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1026 days.

(21) Appl. No.: 13/075,590

(22) Filed: Mar. 30, 2011

(65) Prior Publication Data

US 2012/0254847 A1 Oct. 4, 2012

(51) Int. Cl.
*G06F 9/44* (2006.01)
*G06F 9/45* (2006.01)

(52) U.S. Cl.
CPC .................................... *G06F 8/441* (2013.01)

(58) Field of Classification Search
None
See application file for complete search history.

(56) References Cited

U.S. PATENT DOCUMENTS

| | | | | |
|---|---|---|---|---|
| 5,428,793 A * | 6/1995 | Odnert et al. | ................ | 717/157 |
| 5,555,417 A * | 9/1996 | Odnert et al. | ................ | 717/159 |
| 5,761,514 A * | 6/1998 | Aizikowitz et al. | ........... | 717/158 |
| 6,016,398 A * | 1/2000 | Radigan | ........................ | 717/152 |
| 6,243,864 B1 * | 6/2001 | Odani et al. | ................ | 717/154 |
| 6,523,173 B1 * | 2/2003 | Bergner et al. | .............. | 717/152 |
| 6,931,631 B2 * | 8/2005 | Bates et al. | ................... | 717/129 |
| 7,100,156 B2 * | 8/2006 | Archambault | ............... | 717/159 |
| 7,120,775 B2 * | 10/2006 | Liu et al. | ...................... | 711/170 |
| 7,469,404 B2 * | 12/2008 | Zhang et al. | ................. | 717/156 |
| 8,237,726 B2 * | 8/2012 | Chen et al. | .................... | 345/559 |
| 8,434,074 B2 * | 4/2013 | Janczak et al. | ............... | 717/140 |
| 2002/0095669 A1 * | 7/2002 | Archambault | ............... | 717/157 |
| 2003/0005415 A1 * | 1/2003 | Bates et al. | ................... | 717/129 |
| 2008/0109795 A1 * | 5/2008 | Buck et al. | ................... | 717/137 |

OTHER PUBLICATIONS

Boquist, U., Interprocedural Register Allocation for Lazy Functional Languages, Chalmers University of Technology [online], 1995 [retrieved Apr. 21, 2014], Retrieved from Internet: <URL: http://citeseerx.ist.psu.edu/viewdoc/summary?doi=10.1.1.41.6525&rank=1>, whole document.*

Breternitz, M., et al., "Compilation, Architectual Support, and Evaluation of SIMD Graphics Pipeline Programs on a General-Purpose CPU", IEEE [online], 2003 [retrieved Apr. 21, 2014], Retrieved from Internet: < URL: http://ieeexplore.ieee.org/xpls/abs_all.jsp?arnumber=1238010>, pp. 1-11.*

Anonymous, "Computer Architecture—Addressing Modes" De Montfort University [online], 2008 [retrieved Sep. 11, 2014], Retrieved from Internet: <URL: http://web.archive.org/web/*/http://www.cse.dmu.ac.uk/~sexton/WWWPages/1099/eric/Address.txt>, pp. 1-4.*

(Continued)

*Primary Examiner* — Don Wong
*Assistant Examiner* — Todd Aguilera
(74) *Attorney, Agent, or Firm* — Jordan IP Law, LLC (57) ABSTRACT

Systems and methods of allocating physical registers to variables may involve identifying a partial definition of a variable in an inter-procedural control flow graph. A determination can be made as to whether to terminate a live range of the variable based at least in part on the partial definition. Additionally, a physical register may be allocated to the variable based at least in part on the live range.

24 Claims, 5 Drawing Sheets

(56) References Cited

OTHER PUBLICATIONS

Anonymous, The Authoritative Dictionary of IEEE Standards Terms Seventh Edition, IEEE [online], 2000 [retrieved Sep. 11, 2014], Retrieved From Internet: <URL: http://ieeexplore.ieee.org/xpl/mostRecentIssue.jsp?reload=true&punumber=4116785>, pp. 310,548.*

Araujo, G., et al., "Register Allocation for Indirect Addressing in Loops," ACM Transactions on Programming Languages and Systems, vol. 8, No. 1 [online], 1999 [retrieved Dec. 3, 2014], Retrieved From Internet: <URL: http://www.ic.unicamp.br/~reltech/1998/98-11.pdf>, pp. 1-10.*

Nuzman, D., et al., "Compiling for an Indirect Vector Register Architecture", Proceedings of the 5$^{th}$ Conference on Computing Frontiers [online], 2008 [retrieved Dec. 3, 2014], Retrieved From Internet: <:URL http://dl.acm.org/citation.cfm?id=1366266>, pp. 199-208.*

Muth, "Register Liveness Analysis of Executable Code", Department of Computer Science, Published in 1998, pp. 1-16.

Tarjan, "Depth-First Search and Linear Graph Algorithms", SIAM J. Computing vol. 1, No. 2, Jun. 1972, pp. 146-160.

* cited by examiner

REGISTER LIVENESS ANALYSIS FOR SIMD ARCHITECTURES

BACKGROUND

In computing systems, compilers may be used to assign small sets of physical registers to larger sets of virtual registers (e.g., variables) contained in executable code. In so doing, a conventional compiler might conduct a "liveness analysis" of the code in order to ensure that multiple variables in use at the same time are not assigned to the same physical register. While traditional liveness analysis techniques may be suitable under certain circumstances, there remains considerable room for improvement. For example, single instruction multiple data (SIMD) computing environments can involve vector-based executable code that partially writes to variables, wherein the partial writes may lead to overly-conservative liveness analysis results. Moreover, indirect addressing of variables can further compound the complications associated with partial writes.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may involve a method in which a partial definition of a variable is identified in an inter-procedural control flow graph. The method can provide for determining whether to terminate a live range of the variable based at least in part on the partial definition, and allocating a physical register to the variable based at least in part on the live range.

Embodiments may also include a computer readable storage medium having a set of instructions which, if executed by a processor, cause a computer to identify a partial definition of a variable in an inter-procedural control flow graph. The instructions may further cause a computer to determine whether to terminate a live range of the variable based at least in part on the partial definition, and allocate a physical register to the variable based at least in part on the live range.

Additionally, embodiments can include a system having a main processor, a graphics processor coupled to the main processor, and a computer readable storage medium with a set of instructions which, if executed by the graphics processor, cause the system to identify a partial definition of a variable in an inter-procedural control flow graph. The partial definition may be associated with a single instruction multiple data (SIMD) execution context (which may be a kernel, calling or callee context) in vector-based executable code. The instructions can also cause the system to determine whether to terminate a live range of the variable based at least in part on the partial definition, and allocate a physical register to the variable based at least in part on the live range.

Embodiments may also involve a method in which a context-sensitive traversal of an inter-procedural flow graph is conducted, wherein the inter-procedural flow graph corresponds to vector-based executable code. In addition, a partial definition of a variable can be identified in the inter-procedural control flow graph, wherein the partial definition is associated with a SIMD execution context. The method may also provide for identifying a strongly connected component status of an inter-procedural control flow graph block containing the partial definition, and determining whether to terminate a live range of the variable based at least in part on the strongly connected component status, and whether the strongly connected component contains multiple entry loops, and whether the partial definition is a direct definition. A physical register can be allocated to the variable based at least in part on the live range.

Figure 1:
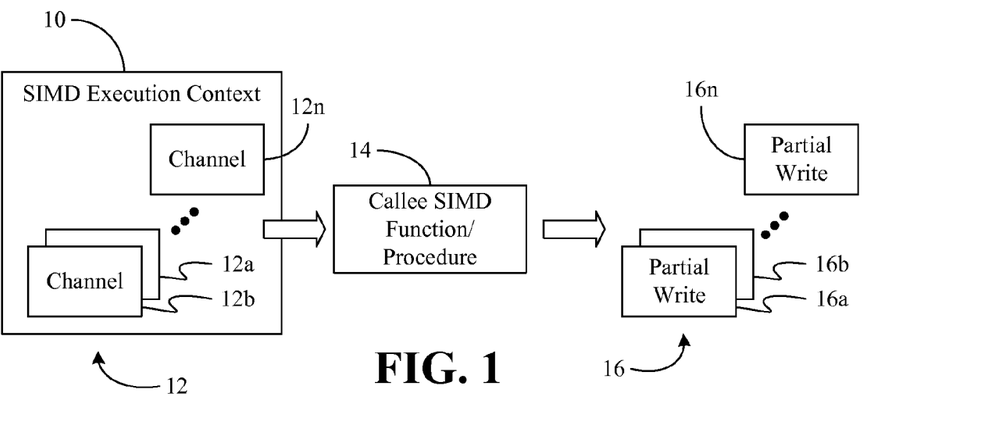
FIG. 1 is a block diagram of an example of a vector-based execution environment involving partial writes according to an embodiment.

Turning now to FIG. 1, a vector-based execution environment is shown in which calling context 10 in a SIMD (single instruction multiple data) execution environment includes a plurality of channels 12 (12a-12n) that invoke one or more callee functions or procedures 14, which in turn conduct a plurality of partial writes 16 (16a-16n) to a virtual register (e.g., a plurality of partial definitions of a variable). For example, if an eight channel SIMD (SIMD8) environment is deployed, there may be eight concurrent program flows and one instruction that writes to a virtual register that may be defined to be a sixteen element vector. In this situation, only eight channels of the virtual register are written to, making it a partial write. Partial writes could also occur in the calling context 10, with or without the existence and/or involvement of the callee SIMD function/procedure 14. As will be described in greater detail, a determination may be made as to whether to terminate the live range of the variable for each partial write 16 based on a number of factors such as a strongly connected component status of an inter-procedural control flow graph block containing the partial write 16, and whether the strongly connected component contains multiple entry loops, and whether the partial write 16 is a direct write.

Consider, for example, a case in which the code involves a standard scalar variable "Y" and a SIMD vector variable "V1" as follows.

1: Y=
2: . . . Y
3: V1(0)= . . .
4: . . .
5: V1(1)= . . .
6: . . . =V1

In the above example, V1(0) and V1(1) represent partial writes to variable V1. The last use of Y is in statement "2:" and the first definition of V1 is in statement "3:". Accordingly, the lifetime of Y and V1 do not overlap. In a conventional liveness analysis, however, neither statement "3:" nor statement "4:" would end up terminating the live range of (e.g., "killing" of the use of) V1. Simply put, the live range of V1 could extend upward, cover statements 1: and 2:, and interfere with variable Y so that the non-interfered V1 and Y interfere with each other artificially. The example provided is highly simplified for ease of explanation. A less trivial example could involve the third and fourth statements being in a branch of a conditional statement, and the fifth and sixth statements also being in a branch of a subsequent conditional statement.

Figure 2:
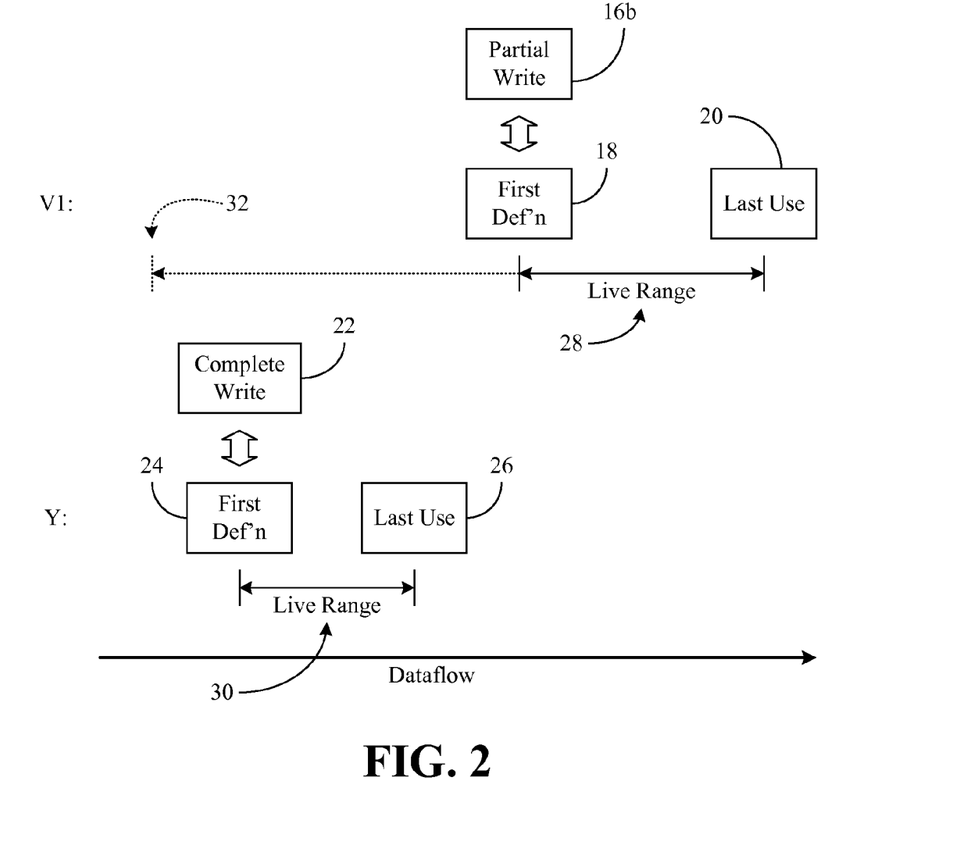
FIG. 2 is a dataflow diagram of an example of a termination of a live range of a partially defined variable according to an embodiment.

FIG. 2 shows one example of the partial write 16b being marked as a first definition 18 of the variable "V1" during a register liveness analysis of the code. The portion of the dataflow between the first definition 18 of the variable and a last use 20 of the variable may be considered the "live range" 28 of the variable. The illustrated example also includes a complete write 22, which may be marked as a first definition 24 of the variable "Y" having a last use 26 that results in a live range 30. Marking the partial write 16b as the first definition 18 of the variable V1 effectively shortens the live range 28 of the variable V1 so that the variable V1 does not interfere with the variable Y. Accordingly, the two variables V1 and Y could be allocated to the same physical register without compromising the value of the physical register. Put another way, failing to mark the partial write 16b as the first definition 18 could result in the live range 28 being extended to an earlier point 32 in the dataflow (e.g., entry node of the inter-procedural control flow graph, described in greater detail below), which could lead to reduced physical register availability and greater system memory usage.

Figure 3A:
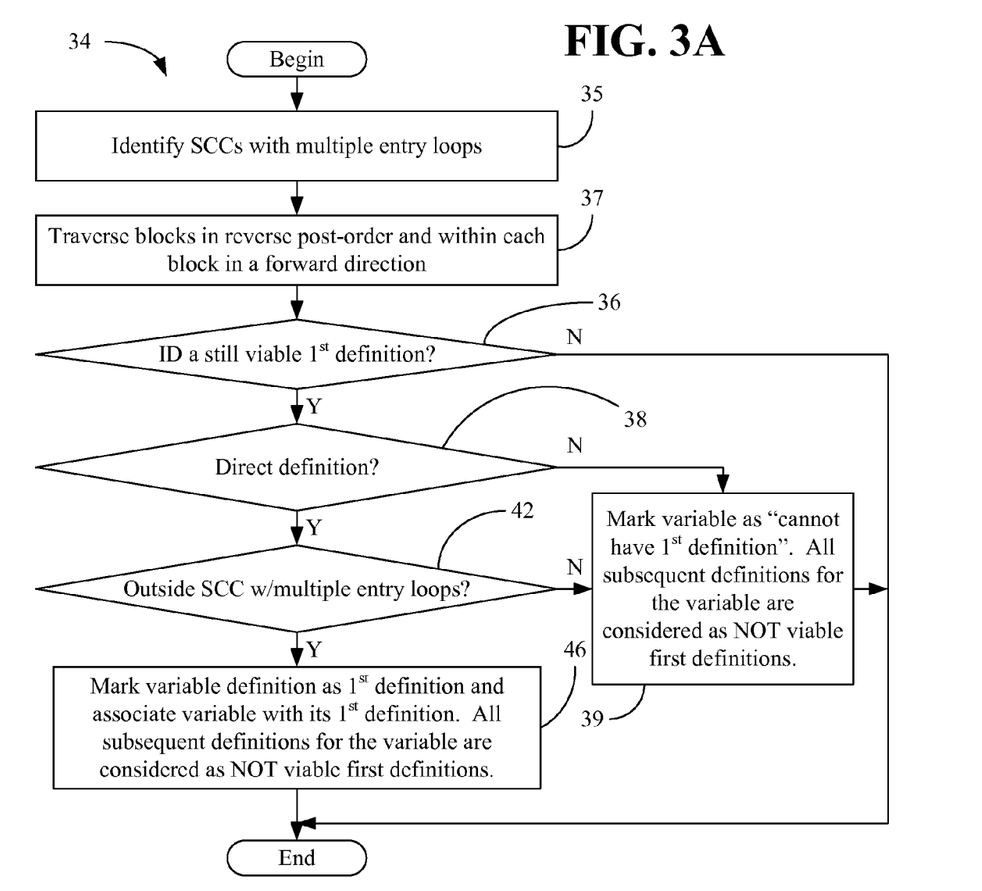
FIG. 3A is a flowchart of an example of a method of marking "first definitions" of variables, a fine-grained technique to terminate live ranges wherever applicable, according to an embodiment.

Turning now to FIG. 3A, a method 34 of marking "first definitions" of variables is shown. The method 34 may be implemented in executable software as a set of logic instructions stored in a machine- or computer-readable medium of a memory such as random access memory (RAM), read only memory (ROM), programmable ROM (PROM), firmware, flash memory, etc., in fixed-functionality logic hardware using assembly language programming and circuit technology such as application specific integrated circuit (ASIC), complementary metal oxide semiconductor (CMOS) or transistor-transistor logic (TTL) technology, or any combination thereof. For example, computer program code to carry out operations shown in method 34 may be written in any combination of one or more programming languages, including an object oriented programming language such as Java, Smalltalk, C++ or the like and conventional procedural programming languages, such as the "C" programming language or similar programming languages.

Processing block 35 provides for analyzing an inter-procedural control flow graph (CFG) to identify any existing strongly connected components (SCCs) having multiple entry loops. In particular, an inter-procedural CFG may be constructed from vector-based executable code, wherein the inter-procedural CFG includes intra-procedural CFGs of the functions within the code, together with additional edges and nodes to account for inter-procedural control flow. As will be discussed in greater detail, the inter-procedural CFG can be used to build function summaries for the sub-graphs of each called function, wherein the function summaries may be used in place of the function sub-graphs to perform final liveness fixed-point iteration computations. Moreover, traversal of the inter-procedural CFG can be context sensitive so that first definitions are correctly identified. A directed graph may be considered strongly connected if there is a path from each vertex in the graph to every other vertex. Strongly connected components can be identified using a number of well documented techniques (see, e.g., Tarjan, R. E., "Depth-first search and linear graph algorithms", SIAM Journal on Computing 1 (2): 146-160, 1972).

Illustrated processing block 37 traverses the blocks of the inter-procedural CFG in reverse post-order (which is a form of forward graph traversal) and in forward order within blocks, and processing block 36 provides for identifying a potential "first definition" of a variable that is still consider as viable for having a "first definition". If such a potential first definition is encountered, illustrated processing block 38 determines whether the potential "first definition" of the variable is a direct definition. In this regard, it may not be appropriate to mark indirect definitions as first definitions if they appear in a block of code that is part of a loop. In particular, each indirect definition in a block that may be executed more than once (e.g., by virtue of being part of a loop) is conceptually not a distinct definition but a set of delineated partial definitions for the variable, wherein each definition is the variable region defined by the $i^{th}$ iteration of the loop. Thus, it may be incorrect to mark the entire set of such partial definitions as first definitions. Actually, only the first member of the set of such partial definitions may be eligible to be marked as a first definition. Absent a way to model the first member of the set, as the members may not be known until runtime, the concept of first definitions may be skipped for variables whose potential "first definition" is an indirect definition. Such variables are deemed not to have an associated "first definition", and all subsequent definitions of such variables are considered as not viable "first definition" candidates.

Figure 4:
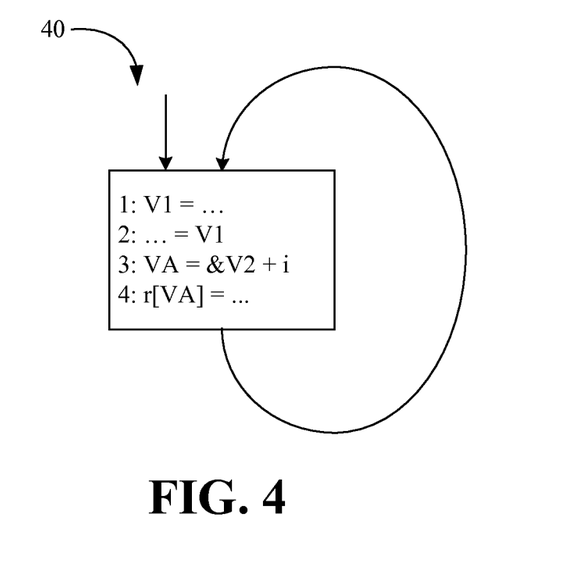
FIG. 4 is a block diagram of an example of an indirect partial definition that is part of a loop according to an embodiment.

FIG. 4 shows an example of an indirect partial definition that is part of a loop. In particular, a code block 40 includes four statements that are part of a loop. If the third or fourth statement were marked as a first definition for "V2", then "V1" could be assigned the same physical register as V2 if they otherwise do not interfere. If the loop iterates more than once, however, then the second iteration may cause the value written to V2 in the first iteration to be over-written with the value of V1. Accordingly, the termination of live ranges may be limited to partial definitions that directly define variables.

Returning now to FIG. 3A, if it is determined that the partial definition is a direct definition, a determination may be made at processing block 42 as to whether the partial definition is outside any existing strongly connected components (SCCs) having multiple entry loops. As already noted, a directed graph may be considered strongly connected if there is a path from each vertex in the graph to every other vertex. If the inter-procedural CFG is irreducible due to loops with multiple entry points, it may not be appropriate to mark direct first definitions in the SCCs containing the multiple entry loops. Thus, if the partial definition of the variable is either an indirect definition or within an SCC having multiple entry loops, the variable is deemed not to have an associated "first definition" at processing block 39, and all subsequent definitions of the variable are considered as not viable "first definition" candidates. If, on the other hand, the partial definition of the variable is a direct definition and the partial definition is not within an SCC having multiple entry loops, processing block 46 provides for terminating the live range of the variable by marking the partial definition as a "first definition" of the variable. All subsequent definitions for a variable that is already associated with a "first definitions" are not considered as viable candidates for being "first definitions", as a variable can have only one and only one "first definition".

Figure 3B:
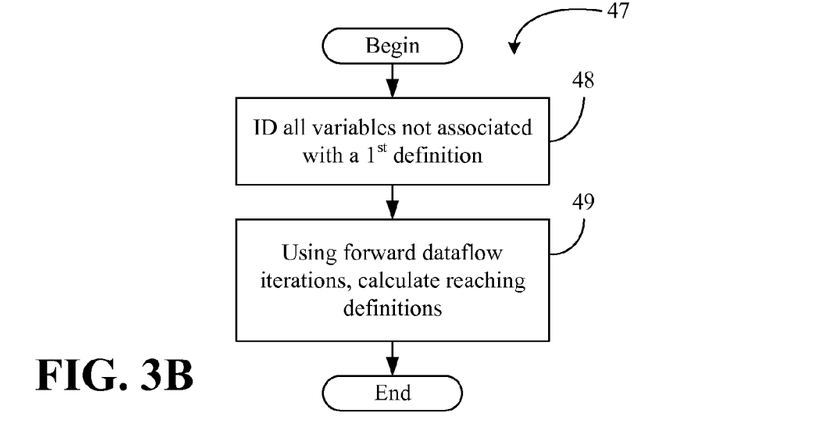
FIG. 3B is a flowchart of an example of a method of determining reaching definitions, used as a coarse-grained technique to terminate live ranges wherever the "first definition" technique is not applicable, according to an embodiment.

FIG. 3B shows a method 47 of identifying the definitions that reach each block in an inter-procedural CFG. Illustrated processing block 48 provides for identifying all variables not associated with a first definition. Processing block 49 may use forward dataflow iterations to calculate the variable definitions that reach each block (e.g., reaching definitions). Thus, the reaching definitions are calculated at the least for all variables that have NOT been associated with a "first definition" after the execution of the phase described in FIG. 3A. Alternatively, the reaching definitions could be calculated for all variables. These reaching definitions will later serve as a coarse-grained mechanism to terminate live ranges wherever the fine-grained "first definition" mechanism is not applicable as depicted in processing block 86a (FIG. 6), discussed below.

Figure 3C:
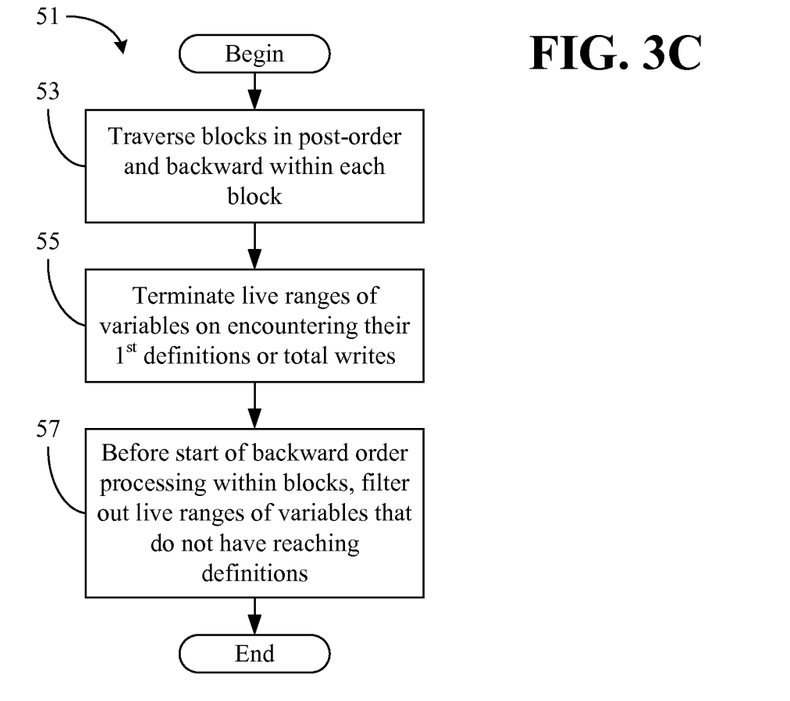
FIG. 3C is a flowchart of an example of a method of terminating live ranges as part of liveness analysis according to an embodiment.

Turning now to FIG. 3C, a method 51 of terminating live ranges is shown. The illustrated method 51 is a refinement to the conventional approach of terminating live ranges during a conventional liveness analysis. In a conventional liveness analysis, a live range is terminated only on encountering a total write for it in a backward traversal of the block. Illustrated processing block 53 traverses the blocks of the inter-procedural CFG in post-order (e.g., a form of backward graph traversal) and backward within each block of the graph. The live ranges of variables may be terminated on encountering a "first definition" for it at processing block 55; this is in addition to the conventional rule in terminating live ranges which is on encountering a total write for it. As already noted, terminating the live ranges of variables can substantially improve performance. Additionally, before the start of processing of a block (in a backward order) the live ranges of variables that do not have reaching definitions for them within the block can be filtered out at processing block 57. Thus, for definitions that could not be safely marked as first definitions in processing block 46 (FIG. 3A) due to being indirect or part of an SCC with multiple entries, a more coarsely grained approach may still be used to limit live ranges. The filtering approach of processing block 57 may be considered more coarsely grained because it works on a block boundary level rather than the finer grained statement level of first definitions. The filtering out of non-reaching definitions is described in greater detail below.

Figure 5:
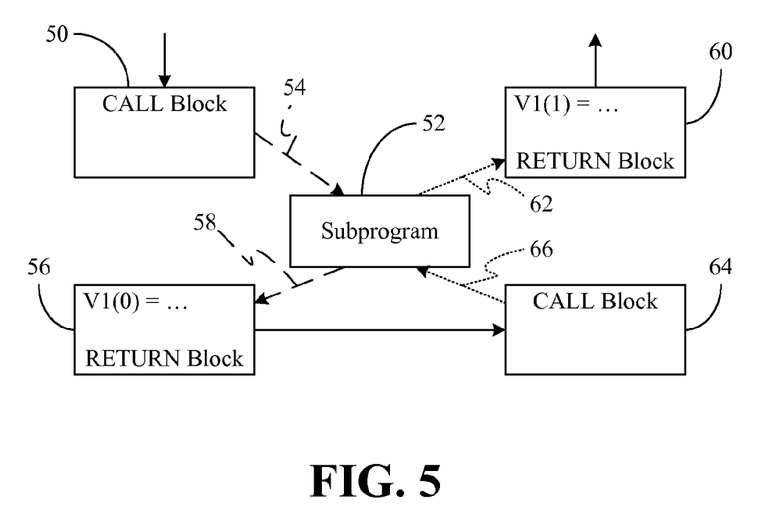
FIG. 5 is a block diagram of an example of a context-sensitive traversal of an inter-procedural control flow graph according to an embodiment.

FIG. 5 demonstrates another case to be considered when marking first definitions. In the illustrated example, a first call block 50 contains a call to a subprogram (e.g., function) 52 along a call edge 54. In order to ensure correct traversal of the graph, traversal of the subprogram 52 may be terminated at the exit node of the subprogram 52, and return link information stored in the call block 50 can be used to resume traversal at a return block 56 along return edge 58. Such a context-sensitive traversal can prevent out of order traversal of a return block 60 along return edge 62, which is appropriately traversed after the subprogram 52 is called by a second call block 64 along call edge 66. The out of order traversal will result in incorrectly marking V1(1) as a first definition, instead of V1(0). In addition, a measure can be implemented at the first call block 50 to ensure that the CFG of the subprogram 52 is traversed (if not already done so at least once) prior to resuming traversal at the return block 56.

Context-sensitive analysis can essentially restrict the dataflow analysis to proceed only along feasible paths through the inter-procedural CFG (ICFG). In the set and equation definitions below, the use of "n" refers to a basic block of code and the use of "f" refers to a function (e.g., subprogram) called by the code. The following sets may be pre-computed prior to performing the dataflow analysis.

TABLE I

| Set | Description |
| --- | --- |
| use[n] | The set of variables that are used directly before they are defined in block n. |
| indir_use[n] or indir[n] | The set of variables that may be used indirectly in block n. |
| use_kill[n] | The set of variables that are killed in block n. |
| def[n] | The set of variables that are defined in block n. |
| output_uses[n] | The set of variables that are to be live after the program has exited. |
| input_defs[n] | The sets of variables that are program inputs. |

The following sets may be used to summarize the effects of each function on liveness.

TABLE II

| Set | Description |
| --- | --- |
| mayuse[f] | The set of variables that may be used by f. A variable (e.g., virtual register r) may be used by f, if there is a realizable path from INIT(f) to a use of r without an intervening total definition of r. It thus describes the set of variables which are always live at INIT[f] independent of the calling context. Typically these are the variables which will be used to pass arguments to function f. |
| bypass[f] | The set of variables which if live at the RETURN node, will be live at the corresponding CALL node. This essentially calculates the set of variables whose liveness is unaltered by the function w.r.t its calling contexts. Typically these are variables which are not at all used by f when considering the scoping rules of the language. |
| maydef[f] | The set of variables that may be defined by f. |
| mustdef[f] | The set of definitions that are defined on all paths from INIT[f] to EXIT[f]. |
| R | This represents the set of all live ranges. |
| icfg_entry_block | The entry block of the inter-procedural CFG. |
| icfg_exit_block | The exit block of the inter-procedural CFG. |

To perform the inter-procedural liveness analysis, three initial fixed-point iterations may be used, wherein the first two iterations compute parts of the function summary related to liveness and the third iteration performs the actual liveness analysis for the ICFG. The final stage of computing the live ranges can conceptually replace the function body sub-graph with the computed function summaries in the corresponding fixed-point computation. Then two final fixed point iterations are used, the first of which computes the final part of the function summary related to reaching definitions and the second of which computes the reaching definitions for blocks in the ICFG after conceptually replacing the function body sub-graph with the just computed part of the function summary in the corresponding fixed-point computation.

Figure 6:
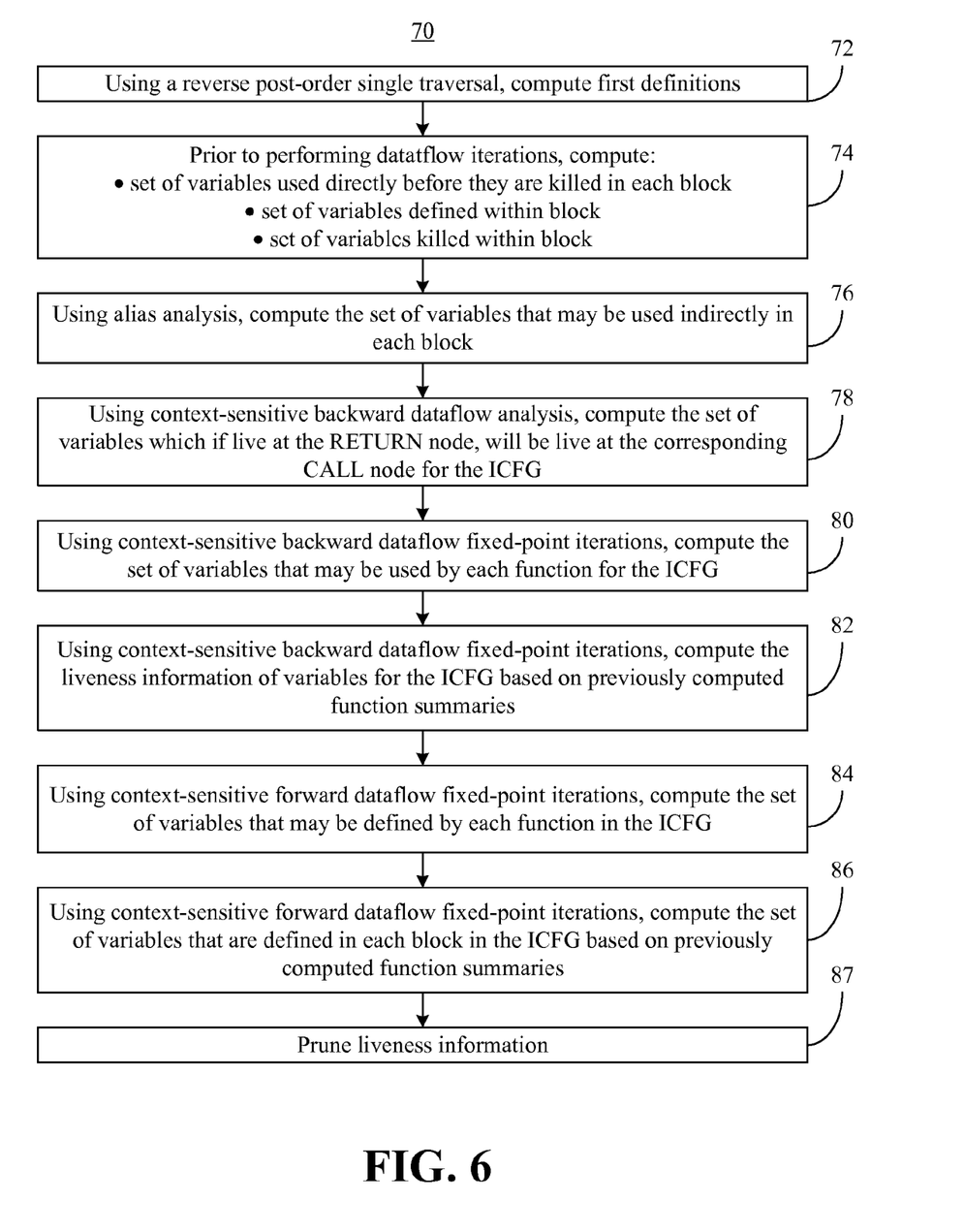
FIG. 6 is a flowchart of an example of a method of conducting an inter-procedural liveness analysis according to an embodiment.

FIG. 6 shows a method 70 of conducting an inter-procedural liveness analysis in the presence of partial writes (partial definitions) and register-indirect uses. Illustrated processing block 72 uses a single traversal of the ICFG in reverse post-order to compute first definitions in an ICFG corresponding to vector-based executable code. This phase may involve marking the "first definitions" for live ranges conservatively. As already discussed, live ranges may be terminated during construction of an interference graph on crossing a "first definition", in addition to the conventional termination of live ranges on crossing a total write (traversals are backward traversals during interference graph building). Processing block 74 provides for computing the following sets of variables prior to execution of fixed point iterations: firstly, the set of variables that are used directly before they are killed in each block either by means of a "first definition" or a total definition (use[n] from Table I—note that general partial definitions are disregarded here); secondly, the set of variables that are defined in each block (e.g., def[n] from Table I—note that both partial and total definitions are to be considered here); thirdly, the set of variables killed within the block (use_kill[n] from Table I—note that only "first definitions" or total writes can be considered as "kills" within a block, but not general partial definitions).

The set of variables that may be used indirectly in each block (e.g., indir_use[n] or indir[n] from Table I) is calculated in illustrated processing block 76 using alias analysis. These are used to determine the set of variables that may be used indirectly in a block. Processing block 78 may use context-sensitive backward dataflow analysis to compute the set of variables for the function which if live at the RETURN node, will be live at the corresponding CALL node for every call to the function in ICFG, by using the pre-computed information as per processing blocks 74 and 76. This essentially calculates the set of variables whose liveness is unaltered by the function w.r.t. its calling contexts (not necessarily the set of variables not used and not defined by the function). The results of this analysis constitute the first part of the function summary (e.g. bypass[f] in Table II). One approach to conducting this computation is shown in the following set of dataflow equations.

```
bypass_out[n] =
    (if type(n) == icfg_exit_block)
        indir[n] + output_uses[n]
    (if type(n) == call and f == callee[n])
        indir[n] + (bypass[f] & bypass_in[return_node(n)])
    (if type(n) != CALL and type(n) != EXIT)
        indir_use[n] + bypass_in[s1] + bypass_in[s2] + ...
        where s1 s2 ... are the successors of n
bypass_in[n] = use[n] + (bypass_out − use_kill[n])
bypass[f] = bypass_in[INIT(f)]
Subject to initialization:
    bypass_out[n] =
        (if type(n) != exit)
            0
        (if type(n) == exit)
            R (pessimistic initialization)
    bypass_in[n] = 0
    bypass[f] = 0
```

The value indir[n] appears in the calculation of bypass_out[n] due to an approximation used in liveness analysis. In particular, to save compilation memory usage and time, the potential indirect uses are not tracked per instruction, but per block. Instead, the indirect uses may be placed in the "use_out" set of the block. Although a tradeoff may come at the cost of some register allocation quality, experimental results show that the tradeoff provides sufficient information without significantly losing the accuracy of liveness.

Illustrated processing block 80 uses context-sensitive backward dataflow fixed-point iterations to compute the set of variables that may be used by each function, by using the pre-computed information as per processing boxes 74, 76 and 78. The results of the analysis constitute the second part of the function summary (e.g., mayuse[f] in Table II). One approach to conducting this computation is shown in the following set of dataflow equations.

```
mayuse_out[n] =
    (if type(n) == icfg_exit_block)
        indir[n] + output_uses[n]
    (if type(n) == call and f == callee[n])
        indir[n] + mayuse[f] + (bypass[f] &
        mayuse_in[return_node(n)])
    (if type(n) != CALL and type(n) != EXIT)
        indir_use[n] + mayuse_in[s1] + mayuse_in[s2] + ...
        where s1 s2 ... are the successors of n
mayuse_in[n] = use[n] + (mayuse_out − use_kill[n])
mayuse[f] = mayuse_in[INIT(f)]
Subject to initialization:
    mayuse_out[n] = 0
    mayuse_in[n] = 0
    mayuse[f] = 0
```

Processing block 82 may use context-sensitive backward dataflow fixed-point iterations to compute the liveness information of variables, i.e. the set of variables live on exit for each block in the ICFG (use_out[n] as shown below) for the ICFG by using the function summaries computed in processing blocks 78 and 80 along with the pre-computed information as per processing blocks 74 and 76. One approach to conducting this computation is shown in the following set of dataflow equations.

```
use_out[n] =
    (if type(n) == icfg_exit_block)
        indir[n] + output_uses[n]
    (if type(n) == call and f == callee[n])
        indir[n] + mayuse[f] + (bypass[f] & use_in[return_node(n)])
    (if type(n) != CALL and type(n) != EXIT)
        indir_use[n] + use_in[s1] + use_in[s2] + ...
        where s1 s2 ... are the successors of n
use_in[n] = use[n] + (use_out − use_kill[n])
use[f] = use_in[INIT(f)]
Subject to initialization:
    use_out[n] = 0 u
    use_in[n] = 0
```

In addition to conducting a liveness analysis, we may also use a forward dataflow to determine if any definition of a variable reaches any particular basic block. The reason for doing this is to calculate additional information that can be used to terminate live ranges of variables whose definitions involve partial writes and for which the "first definition" mechanism of terminating live ranges is not applicable, as already discussed. A context-sensitive analysis may be used in order to propagate definitions only along feasible paths. In addition, two fixed-point iterations can be performed to compute the "def_in" and "def_out" sets. The first iteration may compute a function summary that summarizes the definitions originating from the function body's sub-graph, and the second iteration can compute the "def_in" and "def_out" sets based on the calculated function summary. Example dataflow flow equations for propagating definitions are described below.

Illustrated processing block 84 uses context sensitive forward dataflow fixed-point iterations to compute the set of variables that may be defined by each function (e.g., maydef [f] in Table II). The results of the analysis constitute the third part of the function summary (e.g. maydef[f] in Table II). One approach to conducting this computation is shown in the following set of dataflow equations.

```
maydef_in[n] =
    (if type(n) == icfg_entry_block)
        input_defs[n]
```

-continued

```
    (if type(n) == return and f == callee[n])
    maydef[f] + maydef_out[call_node(n)]
    where type(n) == return and f == callee[n]
    (if type(n) != RETURN and type(n) != INIT)
    maydef_out[p1] + maydef_out[p2] + ...
    where p1 p2 ... are the predecessors of n
        maydef_out[n] = def[n] + maydef_in[n]
        maydef[f] = maydef_out[EXIT(f)]
Subject to initialization:
    maydef_out[n] = 0
    maydef_in[n] = 0
```

Processing block 86 may use context sensitive forward dataflow fixed-point iterations to compute the set of variables that are defined on entry to each block in the ICFG e.g., def_in[n]) using the function summary (maydef[f]) computed in the processing block 84. One approach to conducting this computation is shown in the following set of dataflow equations.

```
def_in[n] =
    (if type(n) == cfg_entry_block)
input_defs[n]
    (if type(n) == return and f == callee[n])
    maydef[f] + def_out[call_node(n)]
    where type(n) == return and f == callee[n]
    (if type(n) != RETURN)
    def_out[p1] + def_out[p2] + ...
    where p1 p2 ... are the predecessors of n
        def_out[n] = def[n] + def_in[n]
Subject to initialization:
    def_out[n] = 0
    def_in[n] = 0
```

The initializations of the fixed-point iterations may also be tuned in order to reduce the number of fixed-point iterations. One observation is that the "mayuse_in/mayuse_out" sets are subsets of the use_in/use_out sets. Accordingly, the mayuse_in/mayuse_out sets can be reused as "use_in/use_out" sets without any copy operations. Thus, the mayuse_in/mayuse_out results of the processing block 74 of the liveness analysis can automatically become the initial values for the use_in/use_out sets of the processing block 76 liveness analysis. Example tuning steps include:

```
a. bypass_in[n] = use_gen[n]
b. mayuse_in[n] = use_gen[n]
c. def_out[n] = def[n]
d. maydef_out[n] = def[n]
e. bypass[f] = bypass_in[INIT(f)]
f. mayuse[f] = mayuse_in[INIT(f)]
g. maydef[f] = maydef_out[EXIT(f)]
h. use_in[n] = &mayuse_in[n]
i. use_out[n] = &mayuse_out[n]
```

With further regard to variables for which partial definitions exist and for which the "first definition" is not applicable, the variables involved could have their uses propagated all the way to the CFG entry node. Since uses for such variables may be meaningless in blocks in which no definition for the variables reach, the variables could be effectively terminated in such blocks. By using a forward dataflow analysis the "def_in" and "def_out" sets may be calculated for each basic block, as already discussed. To determine the use_out and use_in sets for each block, a modification as shown below may be performed. Thus, processing block 87 may prune the live ranges (e.g., liveness information, live sets) in a coarse-grained manner whenever the fine-grained mechanism of "first definitions" is not applicable.

```
use_out[n] = use_out[n] & def_out[n]
use_in[n] = use_in[n] & def_in[n]
```

Figure 7:
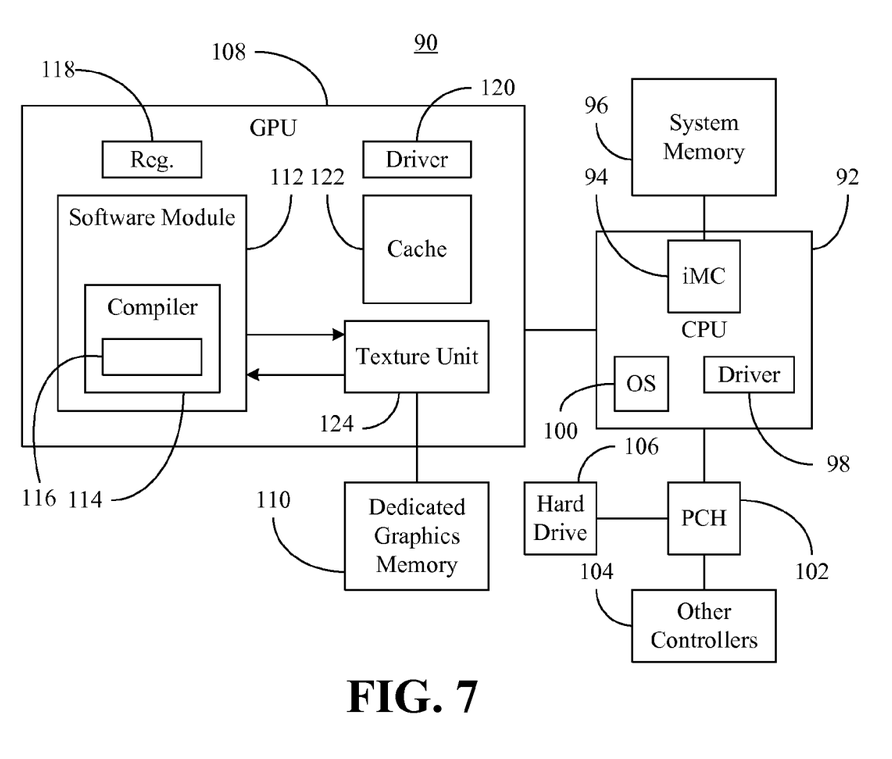
FIG. 7 is a block diagram of a system according to an embodiment.

Turning now to FIG. 7 a computing system 90 is shown, wherein the system 90 may be part of a mobile platform such as a laptop, mobile Internet device (MID), personal digital assistant (PDA), media player, imaging device, etc., any smart device such as a smart phone, smart tablet, smart TV and so forth, or any combination thereof. The system 90 may also be part of a fixed platform such as a personal computer (PC), server, workstation, etc. The illustrated system 90 includes a central processing unit (CPU, e.g., main processor) 92 with an integrated memory controller (iMC) 94 that provides access to system memory 96, which could include double data rate (DDR) synchronous dynamic random access memory (SDRAM, e.g., DDR3SDRAM JEDEC Standard JESD79-3C, April 2008) modules. The modules of the system memory 96 may be incorporated into a single line memory module (SIMM), dual inline memory module (DIMM), small outline DIMM (SODIMM), and so on. The CPU 92 may also have one or more drivers 98 and/or processor cores (not shown), where each core may be fully functional with instruction fetch units, instruction decoders, level one (L1) cache, execution units, and so on. The CPU 92 could alternatively communicate with an off-chip variation of the iMC 94, also known as Northbridge, via a front side bus or a point-to-point fabric that interconnects each of the components in the system 90. The CPU 92 may also execute an operating system (OS) 100 such as a MICROSOFT WINDOWS, LINUX or MAC (MACINTOSH) OS.

The illustrated CPU 92 communicates with a platform controller hub (PCH) 102, also known as a Southbridge, via a hub bus. The iMC 94/CPU 92 and the PCH 102 are sometimes referred to as a chipset. The CPU 92 may also be operatively connected to a network (not shown) via a network port through the PCH 102 and various other controllers 104. Thus, the other controllers 104 could provide off-platform communication functionality for a wide variety of purposes such as wired communication or wireless communication including, but not limited to, cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The other controllers 104 could also communicate with the PCH 102 to provide support for user interface devices such as a display, keypad, mouse, etc. in order to allow a user to interact with and perceive information from the system 90.

The PCH 102 may also have internal controllers such as USB (Universal Serial Bus, e.g., USB Specification 2.0, USB Implementers Forum), Serial ATA (SATA, e.g., SATA Rev. 3.0 Specification, May 27, 2009, SATA International Organization/SATA-IO), High Definition Audio, and other controllers. The illustrated PCH 102 is also coupled to storage, which may include a hard drive 106, read only memory (ROM), optical disk, flash memory (not shown), etc.

The illustrated system 90 also includes a dedicated graphics processing unit (GPU) 108 coupled to a dedicated graphics memory 110. The dedicated graphics memory 110 could include GDDR (graphics DDR) or DDR SDRAM modules, or any other memory technology suitable for supporting graphics rendering. The GPU 108 and graphics memory 110 might be installed on a graphics/video card, wherein the GPU 108 could communicate with the CPU 92 via a graphics bus such as a PCI Express Graphics (PEG, e.g., Peripheral Components Interconnect/PCI Express x16 Graphics 150W-ATX Specification 1.0, PCI Special Interest Group) bus, or Accelerated Graphics Port (e.g., AGP V3.0 Interface Specification, September 2002) bus. The graphics card may be integrated onto the system motherboard, into the main CPU 92 die, configured as a discrete card on the motherboard, etc.

The illustrated GPU 108 executes a software module 112 (e.g., user space code) as part of a graphics application such as a 3D (3-dimensional) computer game, flight simulator, or other 3D imaging system, wherein the graphics application may use SIMD calls to conduct real-time rendering of various graphical scenes. The illustrated software module 112, which might be written in an object-oriented language such as C++, includes a compiler 114 having logic 116 to identify partial definitions of variables in an inter-procedural control flow graph, determine whether to terminate the live range of the variables based at least in part on the partial definitions, and allocate one or more physical registers 118 to the variables based at least in part on the live ranges, as already discussed. Simply put, the illustrated approach works effectively with vector code for SIMD and single process multiple data (SPMD) architectures by dealing with complications presented by the architectures in a unique fashion.

The software module 112 might also include code for pixel shading and other tasks, and the GPU 108 may also include one or more drivers 120, a cache 122, and a rendering module such as a texture unit 124 that could include logic for vertex processing, texture application, rasterization, etc., to enhance and/or support graphics performance. Thus, the illustrated approach can be particularly beneficial in a graphics environment that involves a high level of data parallelism and processing complexity.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
conducting a context-sensitive traversal of an inter-procedural control flow graph corresponding to vector-based executable code;
identifying a partial definition of a variable in the inter-procedural control flow graph, wherein the partial definition is associated with a single instruction multiple data execution context;
identifying a strongly connected component status of an inter-procedural control flow graph block containing the partial definition;
determining whether to terminate a live range of the variable based at least in part on the strongly connected component status, and whether the strongly connected component contains multiple entry loops, and whether the partial definition is a definition that does not use indirect addressing of the variable; and
allocating a physical register to the variable based at least in part on the live range.

2. The method of claim 1, further including terminating the live range of the variable if the partial definition does not use indirect addressing of the variable and the partial definition is not within a strongly connected component containing multiple entry loops, wherein terminating the live range includes marking the partial definition as a first definition of the variable.

3. The method of claim 1, further including filtering out the live range of the variable for a block of the inter-procedural control flow graph if no first definition is associated with the variable, and no definition for the variable reaches the block.

4. The method of claim 1, wherein conducting the context-sensitive traversal includes:
traversing the inter-procedural control flow graph to identify first definitions;
identifying a call block in the inter-procedural control flow graph, wherein the call block calls a subprogram;
terminating traversal of the subprogram at an exit node of the subprogram; and
using return link information stored in the call block to resume traversal at a return node of the call block.

5. A method comprising:
identifying a partial definition of a variable in an inter-procedural control flow graph;
determining whether to terminate a live range of the variable based at least in part on the partial definition wherein the partial definition does not use indirect addressing of the variable;
allocating a physical register to the variable based at least in part on the live range;
identifying a strongly connected component status of an inter-procedural control flow graph block containing the partial definition;
determining whether to terminate the live range of the variable based at least in part on the strongly connected component status and whether the strongly connected component contains multiple entry loops; and
terminating the live range of the variable if the partial definition is a definition that does not use indirect addressing of the variable and the partial definition is not within a strongly connected component having multiple entry loops.

6. The method of claim 5, wherein terminating the live range includes marking the partial definition as a first definition of the variable.

7. The method of claim 5, further including filtering out the live range of the variable for a block of the inter-procedural control flow graph if no first definition is associated with the variable, and no definition for the variable reaches the block.

8. The method of claim 5, further including a context-sensitive traversal of the inter-procedural control flow graph to identify a first definition.

9. The method of claim 8, wherein conducting the context-sensitive traversal includes:
traversing the inter-procedural control flow graph to identify first definitions;
identifying a call block in the inter-procedural control flow graph, wherein the call block calls a subprogram;
terminating traversal of the subprogram at an exit node of the subprogram; and
using return link information stored in the call block to resume traversal at a return node of the call block.

10. The method of claim 5, further including computing at least one of a set of variables that may be defined by a function and a set of variables that may be used indirectly in a block.

11. The method of claim 5, wherein the partial definition is associated with a single instruction multiple data execution context in vector-based executable code.

12. A non-transitory computer readable storage medium comprising a set of instructions which, if executed by a processor, cause a computer to:
identify a partial definition of a variable in an inter-procedural control flow graph;
determine whether to terminate a live range of the variable based at least in part on the partial definition wherein the partial definition does not use indirect addressing of the variable;
allocate a physical register to the variable based at least in part on the live range;
identify a strongly connected component status of an inter-procedural control flow graph block containing the partial definition;
determine whether to terminate the live range of the variable based at least in part on the strongly connected component status and whether the strongly connected component contains multiple entry loops; and
terminate the live range of the variable if the partial definition is a definition that does not use indirect addressing of the variable and the partial definition is not within a strongly connected component having multiple entry loops.

13. The medium of claim 12, wherein the instructions, if executed, cause a computer to mark the partial definition as a first definition of the variable.

14. The medium of claim 12, wherein the instructions, if executed, cause a computer to filter out the live range of the variable for a block of the inter-procedural control flow graph if no first definition is associated with the variable, and no definition for the variable reaches the block.

15. The medium of claim 12, wherein the instructions, if executed, cause a computer to conduct a context-sensitive traversal of the inter-procedural control flow graph to identify a first definition.

16. The medium of claim 15, wherein the instructions, if executed, cause a computer to:
traversing the inter-procedural control flow graph to identify first definitions;
identify a call block in the inter-procedural control flow graph, wherein the call block is to call a subprogram;
terminate traversal of the subprogram at an exit node of the subprogram; and use return link information stored in the call block to resume traversal at a return node of the call block.

17. The medium of claim 12, wherein the instructions, if executed, cause a computer to compute at least one of a set of variables that may be defined by a function and a set of variables that may be used indirectly in a block.

18. The medium of claim 12, wherein the partial definition is to be associated with a single instruction multiple data execution context in vector-based executable code.

19. A system comprising:
a main processor;
a graphics processor coupled to the main processor; and
a non-transitory computer readable storage medium including a set of instructions which, if executed by the graphics processor, cause the system to,
identify a partial definition of a variable in an inter-procedural control flow graph, wherein the partial definition is to be associated with a single instruction multiple data execution context in vector-based executable code;
determine whether to terminate a live range of the variable based at least in part on the partial definition wherein the partial definition does not use indirect addressing of the variable;
allocate a physical register to the variable based at least in part on the live range;
identify a strongly connected component status of an inter-procedural control flow graph block containing the partial definition;
determine whether to terminate the live of the variable based at least in part on the strongly connected component status and whether the strongly connected component contains multiple entry loops; and
terminate the live range of the variable if the partial definition is a definition that does not use indirect addressing of the variable and the partial definition is not within a strongly connected component having multiple entry loops.

20. The system of claim 19, wherein the instructions, if executed, cause the system to mark the partial definition as a first definition of the variable.

21. The system of claim 19, wherein the instructions, if executed, cause the system to filter out the live range of the variable for a block of the inter-procedural control flow graph if no first definition is associated with the variable, and no definition for the variable reaches the block.

22. The system of claim 19, wherein the instructions, if executed, cause the system to conduct a context-sensitive traversal of the inter-procedural control flow graph to identify the partial definition.

23. The system of claim 22, wherein the instructions, if executed, cause the system to:
traversing the inter-procedural control flow graph to identify first definitions;
identify a call block in the inter-procedural control flow graph, wherein the call block is to call a subprogram,
terminate traversal of the subprogram at an exit node of the subprogram, and use return link information stored in the call block to resume traversal at a return node of the call block.

24. The system of claim 19, wherein the instructions, if executed, cause the system to compute at least one of a set of variables that may be defined by a function and a set of variables that may be used indirectly in a block.

* * * * *